United States Patent [19]
Ma

[11] Patent Number: 5,789,751
[45] Date of Patent: Aug. 4, 1998

[54] NON-DIRECTIONAL PYROELECTRIC INFRARED SENSOR

[75] Inventor: Seong Un Ma, Seoul, Rep. of Korea

[73] Assignee: Samsung Electro-Mechanics Co., Ltd., Kyongki-do, Rep. of Korea

[21] Appl. No.: 554,942

[22] Filed: Nov. 13, 1995

[30] Foreign Application Priority Data

Nov. 11, 1994 [KR] Rep. of Korea ............. 1994-29915

[51] Int. Cl.$^6$ ........................................... G01J 5/00
[52] U.S. Cl. .............................. 250/338.3; 250/349
[58] Field of Search ......................... 250/338.3, 349

[56] References Cited

U.S. PATENT DOCUMENTS

| | | | |
|---|---|---|---|
| 4,556,796 | 12/1985 | Renals | 250/338.3 |
| 4,614,938 | 9/1986 | Weitman | 250/349 |
| 4,618,854 | 10/1986 | Miyake et al. | 250/349 |
| 4,697,081 | 9/1987 | Baker | 250/349 |
| 4,772,790 | 9/1988 | Aldridge | 250/349 |
| 4,983,838 | 1/1991 | Nagai et al. | 250/338.3 |
| 4,999,610 | 3/1991 | Guscott | 250/349 |
| 5,229,547 | 7/1993 | Murata et al. | 250/349 |
| 5,281,818 | 1/1994 | Tomita et al. | 250/347 |
| 5,528,038 | 6/1996 | Yoshike et al. | 250/338.3 |

FOREIGN PATENT DOCUMENTS

| | | | |
|---|---|---|---|
| 62-276422 | 12/1987 | Japan . | |
| 02-263122 (A) | 10/1990 | Japan | 250/338.3 |
| 03-180728 (A) | 8/1991 | Japan | 250/338.3 |

*Primary Examiner*—Constantine Hannaher
*Attorney, Agent, or Firm*—Lowe Hauptman Gopstein Gilman & Berner

[57] ABSTRACT

A pyroelectric infrared sensor includes light receiving electrodes and light reflecting electrodes being arranged in a two-set-three-series relative to top and bottom surfaces of the pyroelectric material. The first through sixth light receiving electrodes are formed to be of opposite polarity to each other. The first through sixth reflecting electrodes corresponding to the first through sixth light receiving electrodes are formed on the bottom surface of the material and connected to the connecting electrode of the same polarity so that a sensed signal of the same magnitude of infrared rays having the same energy irrespective of direction is outputted.

5 Claims, 3 Drawing Sheets

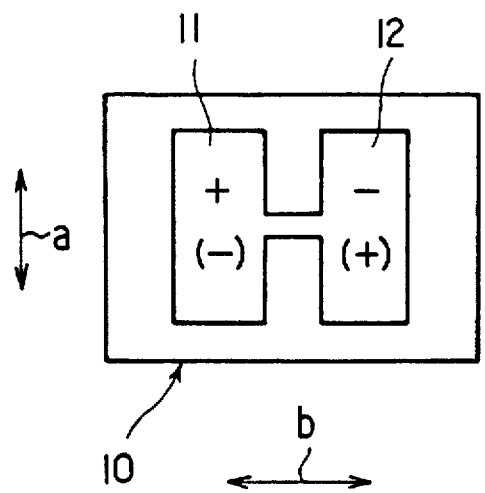
FIG. 1(A)
(PRIOR ART)
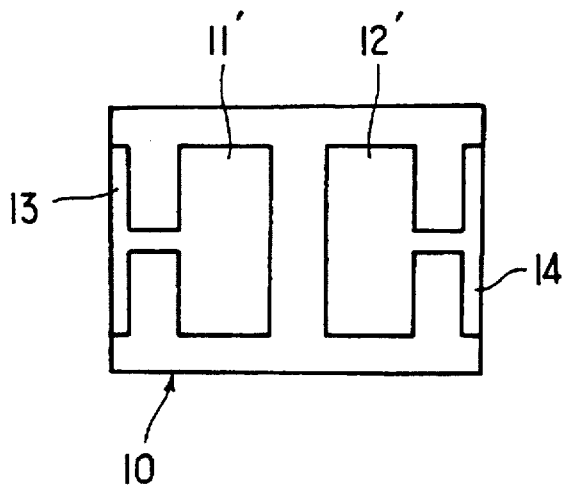
FIG. 1(B)
(PRIOR ART)
FIG. 2(A)
Infrared Ray Input
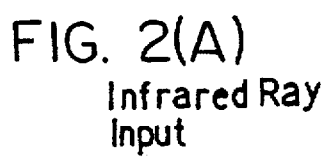
FIG. 2(B)
Variation of Surface Charge
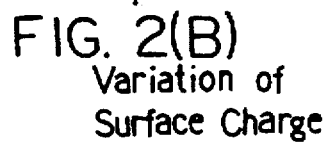
FIG. 2(C)
Sensor output
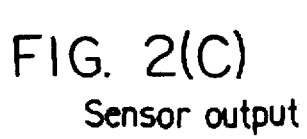
→ time (T)
(PRIOR ART)

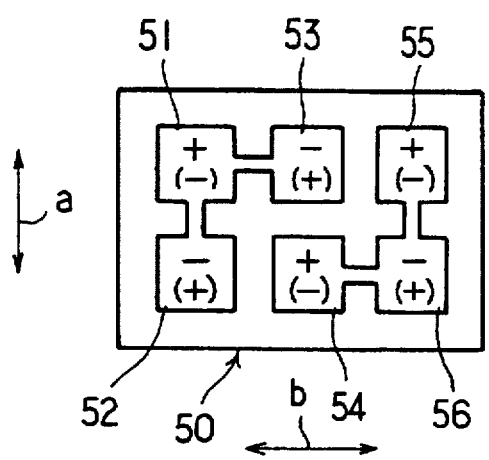
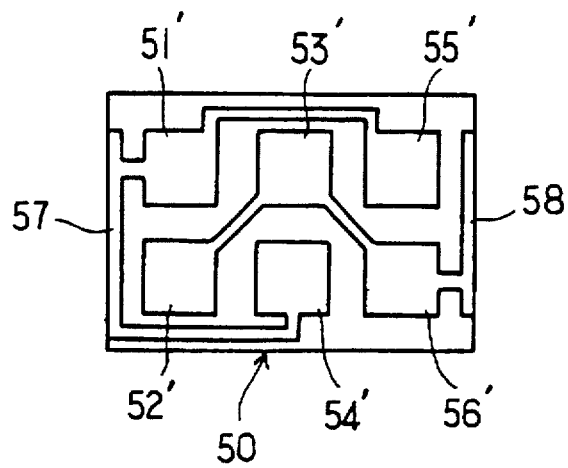
FIG. 5(A)   FIG. 5(B)
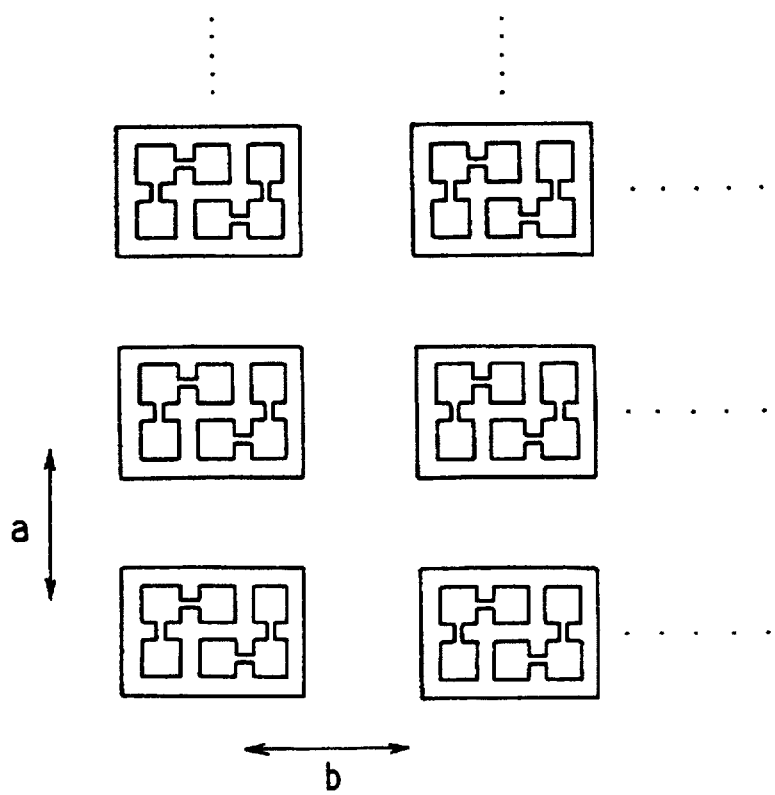
FIG. 6

NON-DIRECTIONAL PYROELECTRIC INFRARED SENSOR

BACKGROUND OF THE INVENTION

The present invention relates to a pyroelectric sensor for sensing a moving material object or a temperature changing material object by non-contacting method by measuring an infrared ray incidented from a material object, and more particularly to a non-directional pyroelectric infrared sensor in which a light receiving electrode and a reflecting electrode made in two-set-three-series are formed at top and bottom surfaces of a pyroelectric material element and then the light receiving electrodes are connected respectively to impedance converting elements in contrary with respective neighboring light receiving electrode, six reflecting elements corresponding to six light receiving elements are formed at bottom surface of the pyroelectric material element, which are made to a structure of two-set-three-series as same as the light receiving electrodes, and the reflecting electrode of same polarity is connected to a same connecting electrode, so that a moving material object is sensed regardless of direction.

In the pyroelectric material being processed to polarize whereby formed with a spontaneous polarization, in usual time, a surface electric charge according to its spontaneous polarization is neutralized by a floating electric charge within atmosphere, but when an infrared rays are radiated to the pyroelectric material, a temperature of the pyroelectric material is changed as much as $\Delta T$. And a magnitude of the spontaneous polarization is changed in response to the temperature change. However, since the floating electric charge can not correspond to the temperature change as fast as the spontaneous polarization, its changing amount is appeared as a surface electric charge. And thereafter, it returns again to an original neutral state. And when this changing of the surface electric charge is used as a signal, it becomes a pyroelectric infrared sensor.

Since this pyroelectric sensor can obtain a pyroelectric output only in case when there is a change in a infrared radiation from the material object, only a temperature changing material object or a moving material object can be sensed, and in case other than a temperature changing material object or a moving material object, at a time when an incident infrared rays are modulated by a chopper and the chopped infrared rays are incidented to the pyroelectric material by each frequency w, a voltage output for a unit infrared strength can be obtained.

FIG. 1(A) and (B) show the structures of a conventional pyroelectric infrared sensor.

As it will be referred in FIG. 1(A), two light receiving electrodes 11,12 are formed at top surface 15 of a pyroelectric material 10, and two reflecting electrodes 11',12' corresponding to said light receiving electrodes 11,12 are formed at bottom surface 15' of the pyroelectric material 10, and each connecting electrode 13,14 is connected to two reflecting electrodes 11',12' so as to obtain a pyroelectric sensing output.

When a material object is moved in b direction against this pyroelectric sensor, an infrared change is incidented to a pyroelectric sensor, and when a temperature of its incidented portion is changed, a polarization state is changed and its changed amount is appeared as a surface electric charge. This surface electric charge is sensed as a voltage signal by an impedance converting device through the connecting electrodes 13,14.

As shown in FIG. 2, when infrared rays as (A) are incidented to the pyroelectric sensor, since a change is occurred in the surface electric charge to the pyroelectric sensor in response to a time axis as in (B), a wave form changing in response to the time axis is obtained as (C).

However, in case where a pyroelectric sensor having a structure as above is arranged in multiple as in FIG. 3, for a movement of material object to an arrow b direction, as shown in FIG. 4(B), a sensing signal of correctly identical magnitude to a material object radiating a same infrared energy although a symbol is opposed (+Vs and −Vs) is outputted, but for a movement of material object, as shown in FIG. 4(A), a sensing signal of other magnitude to a material object radiating a same infrared energy is outputted, so that an image of said moving material object can not be correctly sensed.

Therefore, since a correct sensing signal can not be outputted for a movement of material object to an arrow a direction, in case when a camera is embodied by a conventional pyroelectric infrared sensor, it is hard to obtain an image of correct material object.

OBJECT AND SUMMARY OF THE INVENTION

Therefore, the present invention is directed to solve such problem as above, and it is an object of the present invention to provide a non-directional pyroelectric infrared sensor which is formed to an electrode connecting structure and a polarization state capable of obtaining a correct image irrespective of a moving direction of material object.

Another object of the present invention is to provide a non-directional pyroelectric infrared sensor in which a pyroelectric element is formed to a polarized state in different each other to lateral and longitudinal directions, the reflecting electrodes of pyroelectric element being same in polarization state are connected one another, so that a correct sensing is possible regardless of directions.

In order to attain above objects, the pyroelectric infrared sensor in accordance with the present invention is made such that a number of polarization state of the pyroelectric elements are formed so as to be opposed with neighboring pyroelectric elements, and identically polarized pyroelectric elements are connected each other, and a sensing signal is outputted through the connecting electrodes.

BRIEF DESCRIPTION OF THE DRAWINGS

FIG. 1(A) and (B) are structural drawings of a light receiving electrode and a reflecting electrode of a conventional pyroelectric sensor, FIG. 2(A) to (C) are timing charts for illustrating a signal generating principle of the pyroelectric material.

DETAILED DESCRIPTION OF THE INVENTION

Figure 3:
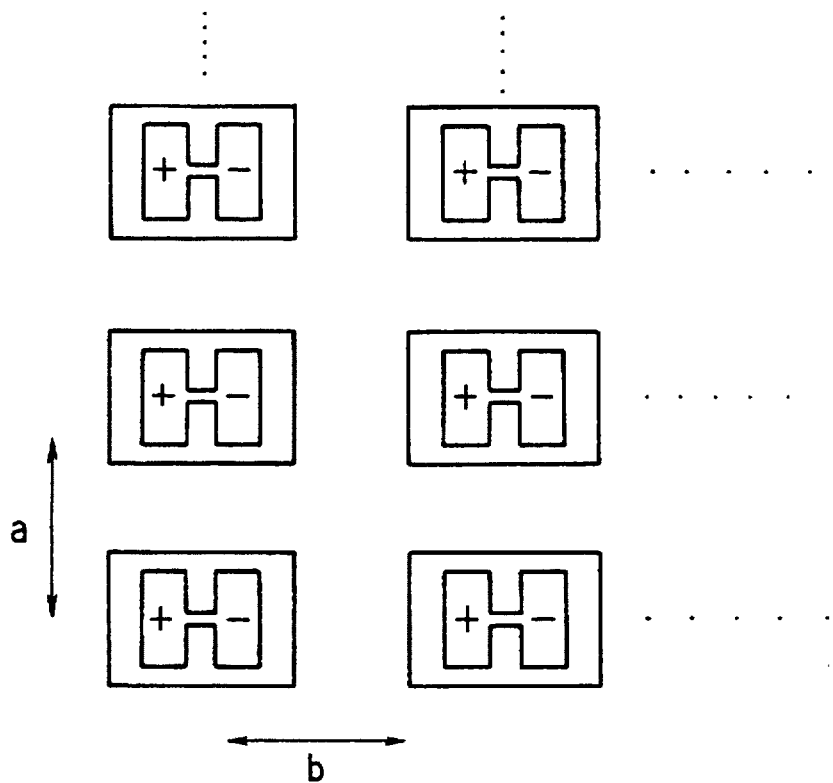
FIG. 3 is a drawing in which a number of conventional pyroelectric infrared sensor are arranged, FIG. 4(A) and (B) are timing charts for illustrating a magnitude of sensing signal produced to an electrode of a conventional pyroelectric infrared sensor, FIG. 5(A) and (B) are structural drawings showing a structure of a light receiving electrode and a reflecting electrode of a pyroelectric infrared sensor in accordance with the present invention, and FIG. 6 are drawings of states that the pyroelectric infrared sensors in accordance with the present invention are arrange in multiple.

Hereinafter, the present invention will be described more in detail with reference to the accompanying drawings.

3

There is shown the electrodes arrangement as structural drawings of non-directional pyroelectric infrared sensor in accordance with the present invention in FIG. 5(A) and (B).

In FIG. 5(A), six light receiving electrodes 51–56 are formed at top surface of the pyroelectric material 50, and which are made to a structure of two-set-three-series. The first and sixth light receiving electrodes 51, 56 being a diagonal direction each other are connected to impedance converting elements in opposite polarity one another (for example : a matter made of field effect transistor and high resistor is mainly used, and its drawing is deleted at here), and the second and third light receiving electrodes 52, 53 neighboring to said first light receiving electrode 51 are connected to the impedance converting element oppositely to the first light receiving electrode. And, the fourth and fifth light receiving electrodes 54, 55 neighboring to said sixth light receiving electrode 56 are connected to the impedance converting element in contrary with the second and third light receiving electrodes 52, 53 and the sixth light receiving electrode 56.

In FIG. 5(B), six reflecting electrodes 51'–56' corresponding to the six light receiving electrodes 51–56 are formed at bottom surface of the pyroelectric material 50, and which are made of a structure of two-set-three-series as same as the receiving electrodes. The first, fourth and fifth reflecting electrodes 51', 54', 55' are connected to the first connecting electrode 57, and the second, third and sixth reflecting electrodes 52', 53', 56' are connected to the second connecting electrode 58.

In FIG. 5(A), when a material object is moved to arrow a direction, the infrared rays are incidented from the first and second light receiving electrodes 51, 52 and a positive + electric charge is generated at the first light receiving electrode 51, and said positive + electric charge is flowed to the connecting electrode 57 through the reflecting electrode 51'. At the same time, a negative – electric charge is generated at the second light receiving electrode 52 and flowed to the connecting electrode 58 through the reflecting electrode 52'.

In FIG. 5(A), when the material object is moved to an arrow b direction, the infrared rays are incidented from the first and second light receiving electrodes 51, 52 and a positive + electric charge is generated at the first light receiving electrode 51, and at the same time, a negative – electric charge is generated at the second light receiving electrode 52 and said positive +, – electric charges are flowed to respective connecting electrodes 57, 58 through the reflecting electrodes 51', 52' as described before.

A sensor part of an image camera utilizing the non-directional pyroelectric infrared sensor in accordance with the present invention is shown in FIG. 6.

As described in FIG. 5(A), when the material object is moved to an arrow a direction, the infrared rays are incedented from the the material object to the first and second light receiving electrodes 51, 52 of the pyroelectric sensor 61 and a positive + electric charge is generated at the first light receiving electrode as described before, and said positive + electric charge is flowed to the connecting electrode 57 through the reflecting electrode 51'. At the same time, a negative – electric charge is generated at the second light receiving electrode 52 and flowed to the connecting electrode 58 through the reflecting electrode 52'. Accordingly, as shown in FIG. 4(B), although the symbols are opposed (+Vs and –Vs) for the material object radiating same infrared energy, a sensing signal of correctly identical magnitudes are outputted, and the correct sensing signal is outputted for the material object movement to the arrow a direction as well.

4

Subsequently, when the infrared rays radiated from a moving material object to an arrow a direction is incidented to the pyroelectric sensor 62, the infrared rays are incidented from the material object to the second light receiving electrode 52 of the pyroelectric sensor 62 and a negative – electric charge is generated and the material object is sensed as described before, and a positive + electric charge is generated at the first light receiving electrode 51 and sensed similarly, and a correct sensing signal is outputted for the material object movement to an arrow A direction as well.

For the material object movement of a arrow b direction, the infrared rays are incidented from the material object to the first and second light receiving electrodes 51, 52 of the pyroelectric sensor 61, and a positive + electric charge is generated at the first light receiving electrode 51 and a negative – electric charge is generated at the second light receiving electrode 52, and said positive and negative +,– electric charges are flowed to respective connecting electrodes 57, 58 through the reflecting electrodes 51', 52' as described before. And, the infrared rays are incidented to the third and fourth light receiving electrodes 53, 54 in response to continuous movement of the material object whereby a negative – electric charge is generated at the third light receiving electrode 53, while a positive + electric charge is generated at the fourth light receiving electrode 54, and said positive and negative +,– electric charges are flowed to respective connecting electrodes 57, 58 through the reflecting electrodes 53', 54'.

Subsequently, the infrared rays are incidented to the fifth and sixth light receiving electrodes 55, 56 in response to continuous movement of the material object whereby the electric charges are generated and flowed to the connecting electrodes 57, 58 whereby a signal is sensed similarly as in tie first and second light receiving electrodes 51, 52.

Figure 4A:
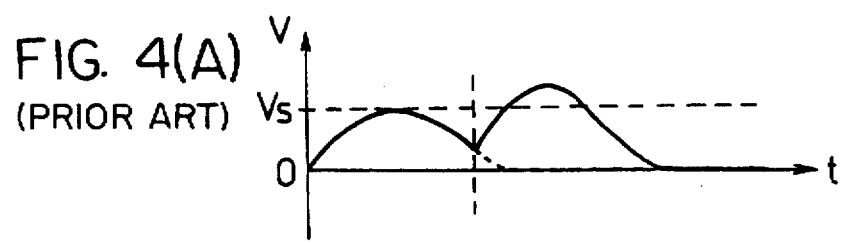
Figure 4B:
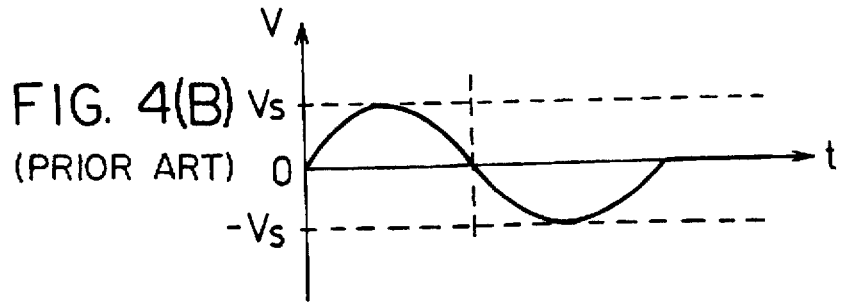

For the pyroelectric sensor 63, the infrared rays are sensed by same process as in above described pyroelectric sensor 61, but subsequent to the fifth and sixth light receiving electrodes 55, 56 of the pyroelectric sensor 61, the first and second light electrodes 51, 52 of the pyroelectric sensor 63 having same electrode arrangement are arranged, and thereby incorrect sensing is generated as shown in FIG. 4(A), but the third and fourth light receiving electrodes 53, 54 being opposed in polarization than the next first and second light receiving electrodes 51, 52 are arranged whereby the correct sensing is made.

Thus, incorrect sensing is partly made in a state continued among one pyroelectric sensor and another pyroelectric sensor, but in a whole, the correct sensing is made.

Accordingly, the correct sensing signal is outputted for the material movement to the arrow b direction.

As described above, in accordance with the present invention, since the incorrectness of the sensing signal according to the continuous arrangement of same light receiving electrodes can be prevented, the correct image can be obtained irrespective of the moving direction of the material object.

What is claimed is:

1. In a non-directional pyroelectric infrared sensor comprising a pyroelectric material, a plurality of light receiving electrodes formed at a top surface of the pyroelectric material, a plurality of reflecting electrodes formed at a bottom surface of said pyroelectric material corresponding to each of said light receiving electrodes, and connecting electrodes for connecting sensing signals outputted from said reflecting electrodes to an external impedance converting circuit, the improvement wherein the non-directional pyroelectric infrared sensor includes said plurality of light receiving electrodes and said reflecting electrodes being arranged in a two-set-three-series having an upper set of three series and a lower set of three series, wherein each of said light receiving electrodes and said reflecting electrodes outputs a sensing signal having a polarity opposite to the polarity of the output signals sensed by the electrodes neighboring in the horizontal and vertical directions.

2. The non-directional pyroelectric infrared sensor of claim 1, wherein said pyroelectric material is polarization processed.

3. In a pyroelectric infrared sensor comprising a pyroelectric material, and a plurality of light receiving electrodes formed at a top surface of said pyroelectric material, a plurality of reflecting electrodes formed at a bottom surface of said pyroelectric material corresponding to each of said light receiving electrodes, and connecting electrodes for connecting sensed signals outputted from said reflecting electrodes to an external impedance converting circuit, said light receiving electrode and the reflecting electrode being arranged by two-set-three series on said top surface three first set and said lower three second set, said light receiving electrodes having a connecting structure such that the electrode of first-set-first series is connected to the electrodes of the first-set-second-series and the second-set-first-series, the electrode of the second-set-third-series is connected to the electrodes of the first-set-third-series and the second-set-second series, said reflecting electrodes having a connecting structure such that the electrode of first-set-first-series is connected to the electrodes of the first-set-third-series and the second-set-second series is connected to one of said connecting electrodes, the electrode of the first-set-second-series is connected to the electrodes of the second-set-first-series and second-set-third-series is connected to another one of said connecting electrodes.

4. The pyroelectric infrared sensor of claim 3, wherein said pyroelectric sensors with said light receiving electrodes and said reflecting electrodes arranged in two-set-three series are arranged in multiplicity by two dimensional arrangement.

5. The pyroelectric infrared sensor of claim 3, wherein said pyroelectric material is polarization processed.

* * * * *